(12) United States Patent
Ganet

(10) Patent No.: US 12,208,709 B2
(45) Date of Patent: Jan. 28, 2025

(54) STOPPER ASSEMBLY FOR A SEAT TRACK ASSEMBLY

(71) Applicant: Lear Corporation, Southfield, MI (US)

(72) Inventor: Paul-Antoine Ganet, Saint-Etienne (FR)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 18/209,339

(22) Filed: Jun. 13, 2023

(65) Prior Publication Data

US 2024/0416802 A1    Dec. 19, 2024

(51) Int. Cl.
  *B60N 2/00*    (2006.01)
  *B60N 2/07*    (2006.01)

(52) U.S. Cl.
  CPC .................................. *B60N 2/0727* (2013.01)

(58) Field of Classification Search
  None
  See application file for complete search history.

(56) References Cited

U.S. PATENT DOCUMENTS

| | | | | |
|---|---|---|---|---|
| 5,100,092 A | * | 3/1992 | Sovis | B60N 2/123 248/429 |
| 7,140,683 B2 | * | 11/2006 | Rausch | B60N 2/123 297/341 |
| 8,191,850 B2 | * | 6/2012 | Wetzig | B60N 2/0727 296/65.01 |
| 8,490,941 B2 | | 7/2013 | Mizuno | |
| 8,678,336 B2 | | 3/2014 | Couasnon | |
| 9,145,069 B2 | | 9/2015 | Yamada | |
| 9,758,061 B2 | | 9/2017 | Pluta | |
| 9,855,862 B2 | | 1/2018 | Supernavage | |
| 11,447,042 B2 | | 9/2022 | Gorcic | |

FOREIGN PATENT DOCUMENTS

| | | | |
|---|---|---|---|
| DE | 102008012213 A1 | 9/2009 | |
| DE | 102008023256 A1 * | 11/2009 | ......... B60N 2/01575 |
| DE | 202016001836 U1 | 6/2017 | |
| EP | 0180422 A2 * | 10/1985 | |
| WO | WO-0015458 A1 * | 3/2000 | ............. B60N 2/071 |
| WO | WO-2013183951 A1 * | 12/2013 | ........... B60N 2/0705 |
| WO | WO-2015198278 A1 * | 12/2015 | ............. A47B 91/08 |

OTHER PUBLICATIONS

Machine English translation for DE202016001836.

* cited by examiner

*Primary Examiner* — Steven M Marsh
(74) *Attorney, Agent, or Firm* — McGarry Bair PC

(57) ABSTRACT

A stopper assembly for a seat track assembly may include a base, a lever, and a spring. The base may be connectable to said seat track assembly. The lever may have a first end and a second end. The second end of the lever may be pivotably connected to the base. The spring may apply a biasing force to the lever and may bias the lever into a stopping position in which the first end of the lever limits movement of a first seat assembly mounted on said seat track assembly in a first direction via contacting said first seat assembly. The lever may be pivotable to a depressed position in which the first end of the lever does not limit movement of said first seat assembly in the first direction.

20 Claims, 8 Drawing Sheets

STOPPER ASSEMBLY FOR A SEAT TRACK ASSEMBLY

TECHNICAL FIELD

The present disclosure generally relates to a stopper assembly for a seat track assembly, including a seat track assembly comprising a stopper assembly and a seating system comprising a seat track assembly having a stopper assembly.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
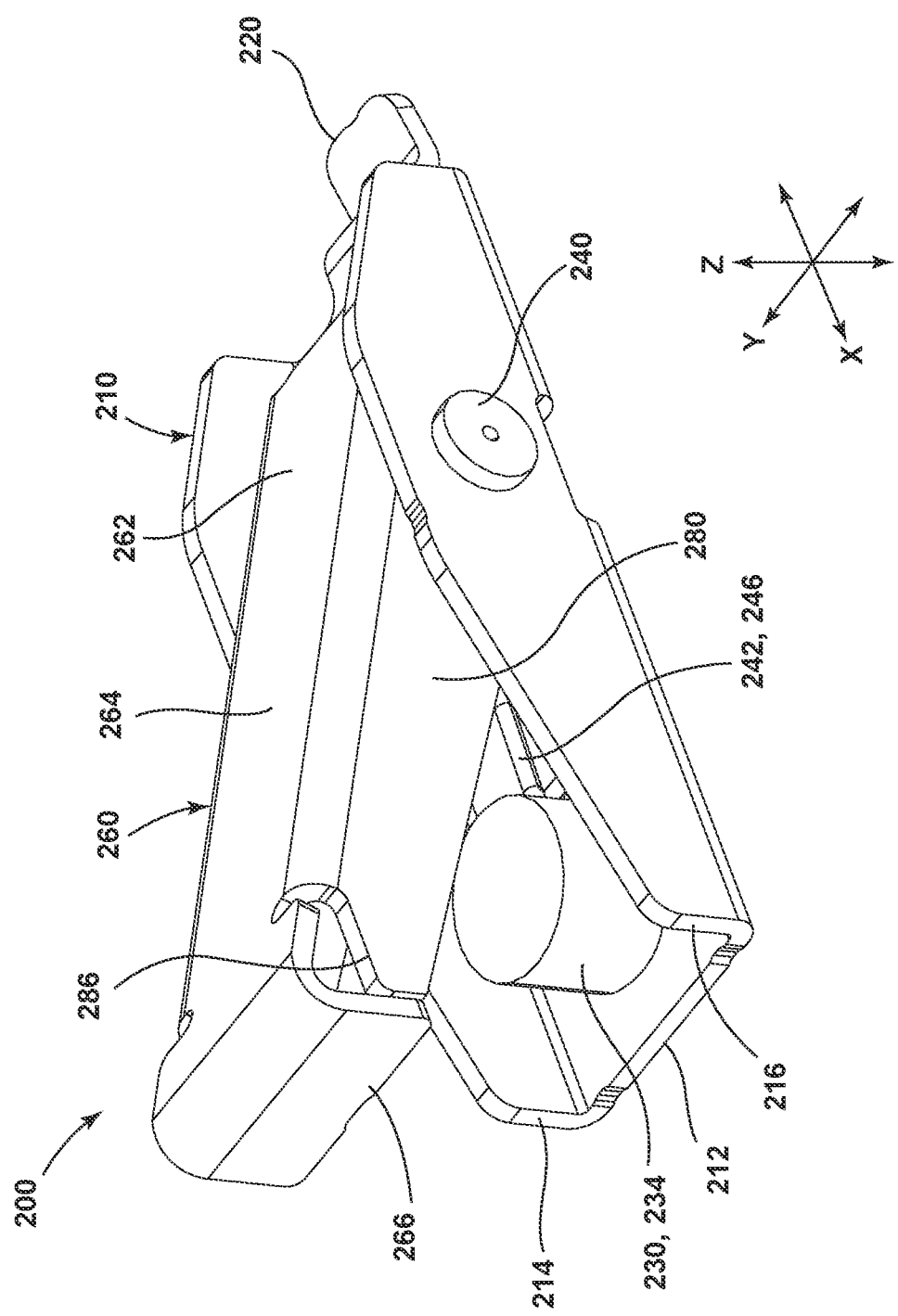
FIG. 1 is a perspective view generally illustrating an embodiment of a stopper assembly according to teachings of the present disclosure.
Figure 2:
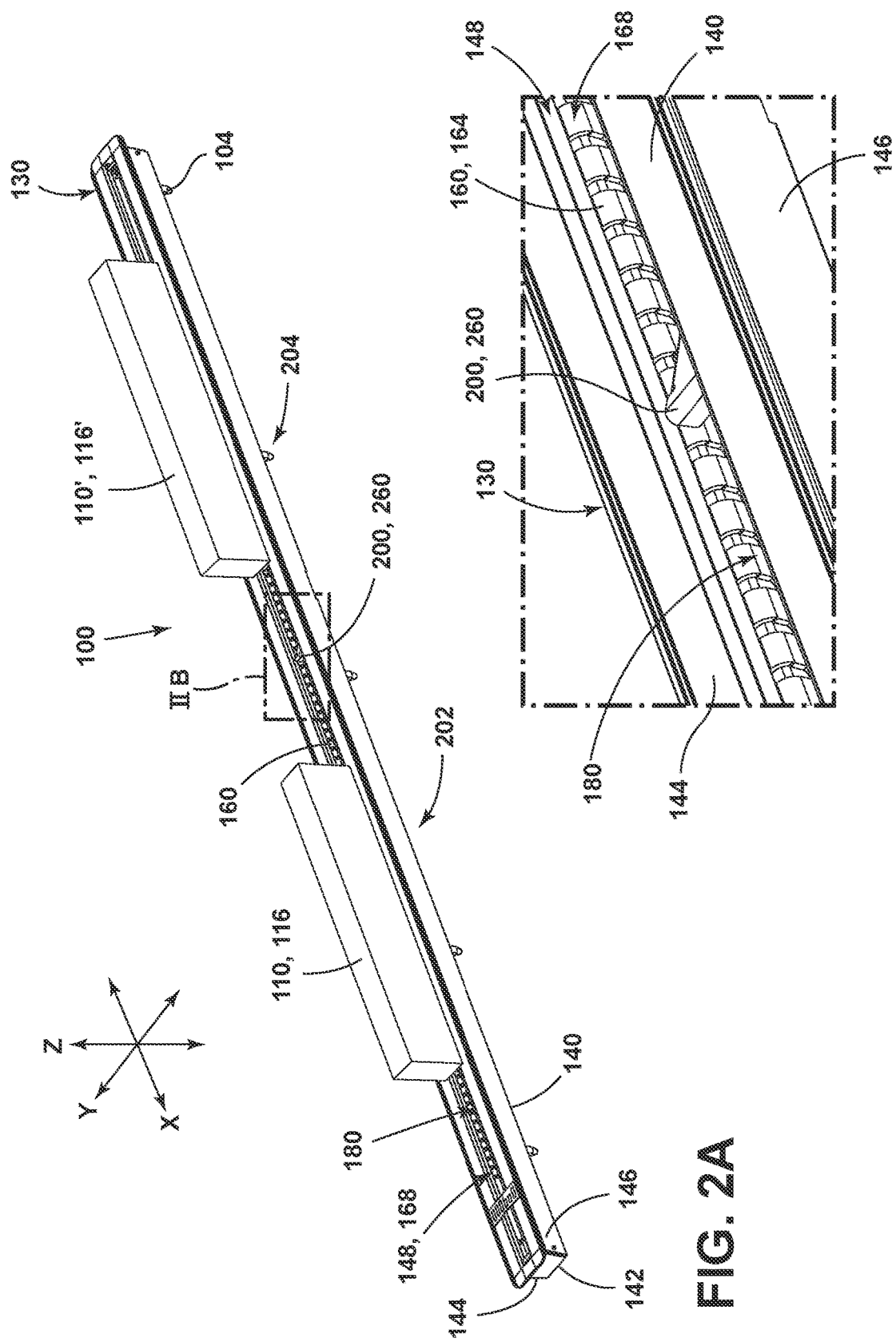
FIG. 2A is a perspective view generally illustrating an embodiment of a seating system including a first seat assembly, a second seat assembly, and a track assembly according to teachings of the present disclosure.
FIG. 2B is a close-up perspective view of a portion of the track assembly of the seating system of FIG. 2A.

FIG. 1 generally illustrates a perspective view of an embodiment of a stopper assembly 200. Additional disclosure concerning stopper assemblies according to aspects or teachings of the present disclosure are disclosed herein, as well as in the drawings.

Referring to FIGS. 2A-6, a seating system 100 is a modular seating system that includes a plurality of components which, when assembled, form one or more vehicle seats, such as for a passenger vehicle (e.g., cars, vans, SUVs, trucks, buses, trains, boats, ships, planes). The seating system 100 may be utilized in any other appropriate situation or apparatus, such as homes, office buildings, theaters, stadiums, recreational vehicles, commercial vehicles, and/or agricultural equipment, among others. The seating system 100 includes one or more seat assemblies 110, 110' and one or more seat track assemblies 130.

As generally illustrated in FIGS. 2A, 3, 4A, 5A, and 6, the seating system 100 includes a first seat assembly 110 and a second seat assembly 110' that are disposed on and adjustable along at least one seat track assembly 130. The first seat assembly 110 may be a front or first row seat and the second seat assembly 110' may be a rear or second row seat, for example. Each seat assembly 110, 110' includes a seat frame, a seat bottom 112, 112', a seatback 114, 114', and one or more support members 116, 116'. The support member 116, 116' is configured as a cassette and is illustrated as simplified block diagrams in FIGS. 2A-6, but may have other suitable configurations in other embodiments.

As generally illustrated in FIG. 2A, the seat assembly 110, 110' includes at least one support member 116, 116'. The support member 116, 116' is connected to the seat frame and/or the seat bottom 112, 112'. The support member 116, 116' is disposed on the track assembly 130 and at least a portion of the support member 116, 116' projects through one or more track openings 148, 168 of the track assembly 130 into a track receptacle 180. The support member 116, 116' can be inserted vertically (e.g., in the Z-direction) and/or horizontally (e.g., in the X-direction and/or Y-direction) into the track receptacle 180 of the track assembly 130 (e.g., via the track openings 148, 168) and can be removed vertically and/or horizontally from the track receptacle 180 of the track assembly 130 (e.g., via the track openings 148, 168), such as to add and/or remove the seat assembly 110, 110' from the vehicle.

The support member 116, 116' selectively and releasably engages and connects to the track assembly 130 to connect the seat assembly 110, 110' to the track assembly 130 and a mounting surface 102 (e.g., a vehicle floor). For example, the support member 116, 116' includes a latch, claw, or other locking structure that selectively and releasably engages an inner track 160 of the track assembly 130 (e.g., via one or more openings or windows of wall 164) and includes a body, protrusion, flange, or similar structure that may contact an outer track 140 of the track assembly 130 (e.g., a lip of one or more walls 144, 146) to selectively restrict and control relative movement between the seat assembly 110, 110' and the track assembly 130 and/or the mounting surface 102. The support member 116, 116' is moveable and/or adjustable along the track assembly 130 to move and/or adjust a position of the seat assembly 110, 110'. For example and without limitation, the support member 116, 116' includes one or more rolling members and the support member 116, 116' rolls along a top surface of the outer track 140 via the rolling members when moving the seat assembly 110, 110' along the track assembly 130.

As generally illustrated in FIGS. 2A-6, the seating system 100 includes one or more seat track assemblies 130. The track assembly 130 is connected to the mounting surface 102 (e.g., a vehicle floor). The track assembly 130 facilitates selective connection of the seat assemblies 110, 110' to the mounting surface 102 and also facilitates adjustment of the seat assemblies 110, 110' relative to one another and/or the mounting surface 102. The seat assemblies 110, 110' may be adjusted along the track assembly 130 manually and/or via an actuator (e.g., one or more electric motors operatively connected to one or more of the seat assemblies 110, 110' and/or the track assembly 130).

In at least some examples, the seating system 100 includes two seat track assemblies 130. The track assemblies 130 are disposed adjacent to one another and extend parallel to one another. The track assemblies 130 are structured identically to one other as described in detail below, but may be structured differently from one another in other embodiments. The track assemblies 130 are laterally offset from each other (e.g., a Y-direction) such that the track assemblies 130 are generally aligned with respective outer sides of the seat assemblies 110, 110'. The track assemblies 130 each selectively and releasably engage and connect to a respective support member 116, 116' of one or more of the seat assemblies 110, 110'. For example, a first support member 116 of the first seat assembly 110 and a first support member 116' of the second seat assembly 110' may be disposed on a first track assembly 130 and the first support members 116, 116' may each project into the track receptacle 180 of the first track assembly 130. A second support member 116 of the first seat assembly 110 and a second support member 116' of the second seat assembly 110' may be disposed on a second track assembly 130 and the second support members 116, 116' may each project into the track receptacle 180 of the second track assembly 130. However, the seating system 100 may conceivably include any number of seat assemblies 110, 110' and seat track assemblies 130 and different combinations thereof (e.g., a single seat assembly and a single seat track assembly, two seat assemblies and a single seat track assembly, three seat assemblies and two seat track assemblies, two seat assemblies and three seat track assemblies).

As generally illustrated in FIGS. 2A, 2B, 4B, and 5B, the track assembly 130 includes a track pair defined by an outer track 140 and an inner track 160 that is disposed at least partially within the outer track 140. The tracks 140, 160 are each structured as an elongated member extending generally in an X-direction (e.g., a longitudinal direction) and facilitate movement and/or adjustment of the seat assemblies 110, 110' along the track assembly 130. The outer track 140 may include and/or be composed of a first material (e.g., aluminum) that may be relatively light. The inner track 160 may include and/or be composed of a second material (e.g., steel) that may be relatively strong compared to the first material.

The tracks 140, 160 each have a bottom 142, 162 and two walls (e.g., a first wall 144, 164 and a second wall 146) protruding from the bottom 142, 162 to form a generally U-shaped cross-section in a Y-Z plane (e.g., in a plane perpendicular to an X-direction). A track opening 148, 168 is defined between the two walls 144, 146, 164 of the track 140, 160. The inner track 160 is disposed at least partially within the outer track 140. The bottom 162 of the inner track 160 is disposed on the bottom 142 of the outer track 140. The bottom 142, 162 of the tracks 140, 160 are connected to one another and to the mounting surface 102 via one or more connectors 104 (e.g., bolts, rivets, etc.) thereby securing the track assembly 130 to the mounting surface 102. The first wall 144 of the inner track 160 is disposed adjacent to the first wall 144 of the outer track 140. The second wall of the inner track 160 is disposed adjacent to the second wall 146 of the outer track 140.

The track assembly 130 includes a track receptacle 180 configured to receive and at least temporarily retain at least a portion of one or more support members 116, 116' of one or more seat assemblies 110, 110'. The track receptacle 180 is defined by the bottom 142 and the two walls 144, 146 (e.g., the U-shaped cross section formed thereby) of the outer track 140. The track receptacle 180 includes an inner region 182 and an outer region 184. The inner region 182 is defined by the bottom 162 and the two walls 164 (e.g., the U-shaped cross section formed thereby) of the inner track 160. The outer region 184 is the portion of the track receptacle 180 outside of and/or surrounding the inner track 160 and/or the inner region 182. A portion of a support member 116, 116' is insertable into and retained within the track receptacle 180 (e.g., in both the inner region 182 and the outer region 184 thereof) via the track openings 148, 168.

As generally illustrated in FIGS. 1-6, the track assembly 130 includes one or more stopper assemblies 200 that limit, restrict, and/or control movement of one or more seat assemblies 110, 110' along and the track assembly 130. The stopper assembly 200 is configured to contact the first seat assembly 110 to limit, restrict, block, and/or prevent movement of the first seat assembly 110 along the track assembly 130 in a first direction D1 (e.g., generally toward the second seat assembly 110' in the X-direction). In this manner, the stopper assembly 200 is able to prevent the first seat assembly 110 from being adjusted to an undesirable position, such as to a position in which the first seat assembly 110 is too close to the second seat assembly 110' and encroaches on the occupant of the second seat assembly 110'. The stopper assembly 200 is configured to withstand at least a 5,000N load. The stopper assembly 200 is also configured to not restrict block, and/or prevent movement of the second seat assembly 110' along the track assembly 130 in a second direction D2 opposite the first direction D1 (e.g., generally toward the first seat assembly 110 in the X-direction). The second seat assembly 110' can thus be adjusted and/or moved as close to the first seat assembly 110 as desired to increase the amount of available space behind the second seat assembly 110', such as to increase storage area and/or provide additional space to an occupant (e.g., of a third-row seat).

The stopper assembly 200 is disposed at least partially within the inner region 182 of the track receptacle 180 and is connected to the inner track 160. The stopper assembly 200 includes a base 210, a pin 240, a biasing member 242, and a lever 260. The stopper assembly 200 and/or portions thereof are generally composed of one or more metals, such as steel, but may be composed of a variety of other suitable materials so long as the stopper assembly 200 is capable of withstanding a desired load (e.g., 5,000N).

The base 210 secures the stopper assembly 200 to the track assembly 130 and supports the lever 260. In examples, the base 210 may be a bracket-like structure, such as a mounting bracket. The base 210 has a bottom 212 and two walls (e.g., a first wall 214 and a second wall 216) projecting from opposite sides of the bottom 212 to form a generally U-shaped cross-section in a Y-Z plane (e.g., in a plane perpendicular to an X-direction). As generally illustrated in FIGS. 4B and 5B, a recess 218 is disposed at or about a first end of the bottom 212 and a mounting tab 220 is disposed at or about a second end of the bottom 212, which is opposite the first end. In other embodiments, the recess 218 is disposed at the second end of the bottom 212 and the mounting tab 220 is disposed at the first end of the bottom 212. The recess 218 and the mounting tab 220 facilitate connection of the base 210, and consequently the stopper assembly 200, to the track assembly 130 (e.g., to the inner track 160).

As generally illustrated in FIGS. 1, 4B, and 5B, the mounting tab 220 is configured to engage the inner track 160 to connect the base 210 to the inner track 160. The mounting tab 220 is connected to and projects from the second end of the bottom 212 generally in an X-direction (e.g., away from the recess 218 of the base 210). The mounting tab 220 includes a step region that provides the mounting tab 220 with a generally S-shaped profile in a plane perpendicular to the Y-direction. The mounting tab 220 extends through an opening 172 in the inner track 160 and into an opening 152 of the outer track 140. Withing the opening 152, the free end of the mounting tab 220 contacts an underside surface of the bottom 162 of the inner track 160. The step region of the mounting tab 220 is disposed at least partially within the opening 172 of the inner track 160 and facilitates engagement of the free end of the mounting tab 220 and the inner track 160. The mounting tab 220 may alternatively have other suitable configurations. For example, the mounting tab 220 may project generally vertically from the bottom 212 and/or may have a spade or semi-circular shaped portion disposed at its free end for further securing the mounting tab 220 in the opening 172.

As generally illustrated in FIGS. 4B and 5B, the recess 218 is configured to receive and engage a fastener 230 that connects the base 210, and consequently the stopper assembly 200, to the track assembly 130. The recess 218 is disposed in, defined by, and extends vertically (e.g., generally in the Z-direction) through the bottom 212. The recess 218 is disposed in vertical alignment with a recess 170 of the inner track 160 and a recess 150 of the outer track 140. The fastener 230 is configured as a rivet in the illustrative example shown in FIGS. 1, 4B, and 5B, but may have other suitable configurations (e.g., a bolt, screw, pin) in other embodiments. The fastener 230 is disposed at least partially within the recesses 218, 170, 150 of the base 210, the inner track 160, and the outer track 140. A shaft 232 of the fastener 230 is disposed in and extends through the recess 218 of the base 210 and the recess 170 of the inner track 160. A first head 234 of the fastener 230 is disposed on and engages the bottom 212 of the base 210 (e.g., a surface of the bottom 212 facing toward the lever 260). A second head 236 of the fastener 230 is disposed on and contacts (e.g., an underside surface) of the inner track 160. The second head 236 of the fastener 230 is disposed completely within (e.g., is recessed within) the recess 150 of the outer track 140, which facilitates mounting of the track assembly 130 on the mounting surface 102 and reduces and/or prevents interference by the second head 236 (e.g., via the second head 236 of the fastener 230 contacting the mounting surface 102 and preventing the track assembly 130 from resting properly and/or stably on the mounting surface 102).

The pin 240 is connected to and extends between the two walls 214, 216 of base 210 (e.g., in the Y-direction). The pin 240 is disposed spaced apart from the bottom 212 of the base 210 (e.g., in the Z-direction) and extends substantially parallel to the bottom 212 of the base 210. The pin 240 is disposed in and extends through two pin openings of the lever 260 thereby pivotably connecting the lever 260 to the base. The pin 240 defines an axis about which the lever 260 is pivotable and/or rotatable.

The biasing member 242 biases the lever 260 about the pin 240 (e.g., in a direction away from the base 210) toward and/or into a stopping position via applying a biasing force to the lever 260. The biasing member 242 is configured as a torsion spring 242 in the illustrative example shown in FIGS. 1, 4B, and 5B, but may have other suitable configurations (e.g., a compression spring, tension spring, leaf spring) in other embodiments. The torsion spring 242 is disposed on and wound around the pin 240 between two sidewalls 270, 280 of the lever 260, which connects and secures the torsion spring 242 to the base 210. The torsion spring 242 includes a first spring leg 244 that contacts and/or rests on a main body 262 of the lever 260 and a second spring leg 246 that contacts and/or rests on the bottom 212 of the base 210.

The lever 260 is an elongated member configured to contact and/or abut the seat assemblies 110, 110'. The lever 260 has a first longitudinal end for contacting and/or abutting the support member 116 of the first seat assembly 110 to limit, restrict, and/or block movement of the first seat assembly 110 on the track assembly 130 in the first direction D1. The lever 260 also has an opposite, second longitudinal end that is pivotably and/or rotatably connected to the base 210 via the pin 240. The lever 260 is pivotable and/or rotatable about the pin 240 to a stopping position (see, e.g., FIGS. 1-4B) and to a depressed position (see, e.g., FIGS. 5A-6, also shown in phantom in FIG. 3), among other positions therebetween. When the lever 260 is in the stopping position, the stopper assembly 200 limits, restricts, and/or blocks movement of the first seat assembly 110 along the track assembly 130 in a first direction D1 but does not limit, restrict, and/or block movement of the second seat assembly 110' along the track assembly 130 in an opposite, second direction D2. When the lever 260 is in the depressed position, the stopper assembly 200 does not limit, restrict, and/or block movement of the first seat assembly 110 nor the second seat assembly 110' along the track assembly 130. The lever 260 is biased into the stopping position via the biasing member 242. The lever 260 is adjustable, moveable, pivotable, and/or rotatable from the stopping position toward and/or to the depressed position via movement of the second seat assembly 110' and/or manually by a user (e.g., a user may press down on the lever 260 with their hand, finger, and/or an object to pivot the lever 260 into the depressed position).

The lever 260 has a main body 262 and two sidewalls 270, 280 (e.g., a first sidewall 270 and a second sidewall 280) projecting from opposite sides of the main body 262 to form a generally U-shaped cross-section in a Y-Z plane (e.g., in a plane perpendicular to an X-direction). The main body 262 has an actuation surface 264 that faces generally toward the track openings 148, 168 and/or away from the base 210 (e.g., generally upward in the Z-direction). A stop flange 266 is disposed at the first longitudinal end of the lever 260 and projects transversely (e.g., obliquely) from the main body 262 generally towards the base 210 and/or the bottom 162 of the inner track 160 (e.g., generally downward in the Z-direction). The stop flange 266 contacts and/or abuts a contact surface 118 (e.g., of a shock-absorbing bumper) of the support member 116 of the first seat assembly 110 to limit, restrict, and/or block movement of the first seat assembly 110.

The sidewalls 270, 280 each include a pin opening that receives the pin 240. The two pin openings are disposed in alignment with one another at or about the second longitudinal end of the lever 260. A free end of each of the sidewalls 270, 280 includes a curved surface region 272 and a linear surface region 274, which is tangential the curved surface region 272, that selectively contact the bottom 212 of the base 210. The sidewalls 270, 280 therefore at least partially support the lever 260, which may reduce the amount of stress and/or force on the pin 240 and increase the surface life of the pin 240. The linear surface region 274 contacts and rests on the bottom 212 of the base 210 when the lever 260 is in the stopping position thereby preventing the lever 260 from pivoting beyond the stopping position (e.g., via the biasing force of the biasing member 242 and/or a force from the support member 116 colliding, contacting, and/or pressing against the lever 260). At least a portion of the curved surface region 272 contacts the bottom 212 of the base 210 when the lever 260 is in the depressed position and/or while the lever 260 is pivoting about the pin 240. The sidewalls 270, 280 each include a protrusion 276, 286 disposed at the first longitudinal end of the lever 260. The protrusions 276, 286 are disposed adjacent to and/or in contact with a backside of the stop flange 266. The protrusions 276, 286 support the stop flange 266 to limit and/or resist deformation of the stop flange 266 (e.g., due to a force from the support member 116 colliding contacting, and/or pressing against the lever 260).

As generally illustrated in FIGS. 1 and 4B, when the lever 260 is in the stopping position, the lever 260 and the actuation surface 264 extend obliquely relative to the bottom 212 of the base 210 with the first longitudinal end of the lever 260 and the stop flange 266 oriented toward the first seat assembly 110. The first longitudinal end of the lever 260 and the stop flange 266 at least partially protrude from the track opening 168 of the inner track 160 and are at least partially disposed in the outer region 184 of the track receptacle 180. The stop flange 266 is disposed in alignment with the contact surface 118 of the support member 116, 116' of the first seat assembly 110 (e.g., in the Y-direction and the Z-direction). The stop flange 266 and/or a surface thereof is oriented in a complimentary manner to the contact surface 118 of the support member 116 such that the stop flange 266 contacts the contact surface of the support member 116 in a substantially flush manner. As such, the contact surface area between the support member 116 and the lever 260 is increased, which distributes the stopping force applied to the support member 116 via the lever 260 across a greater area reducing pressure. The linear surface region 274 of each of the sidewalls 270, 280 of the lever 260 contacts and rests on the bottom 212 of the base 210 thereby preventing the lever 260 from pivoting beyond the stopping position.

As generally illustrated in FIG. 5B, when the lever 260 is in the depressed position, the lever 260 (e.g., the first longitudinal end and the stop flange 266) is disposed out of alignment with the support members 116, 116' (e.g., in at least the Z-direction) thereby allowing the support members 116, 116' to pass over the stopper assembly 200 (e.g., while sliding across the actuation surface 264 of the lever 260) and the seat assemblies 110, 110' to slide freely along the track assembly 130. The first longitudinal end of the lever 260 and the stop flange 266 are disposed closer to the bottom 212 of the base 210 than when the lever 260 is disposed in the stopping position. The lever 260 and the actuation surface 264 extend obliquely or generally parallel to the bottom 212 of the base 210 such that an angle defined between the bottom 212 of the base 210 and the lever 260 (e.g., the main body 262 and/or the actuation surface 264) is smaller when the lever 260 is in the depressed position than when the lever 260 is in the stopping position. The first longitudinal end of the lever 260 and the stop flange 266 do not protrude from the track opening 168 of the inner track 160 and are disposed completely in the inner region 182 of the track receptacle 180. At least a portion of the curved surface region 272 of each of the sidewalls 270, 280 of the lever 260 contacts and rests on the bottom 212 of the base 210 and the linear surface region 274 is lifted off of the bottom 212 of the base 210. Additionally, the first head 234 of the fastener 230 is disposed at least partially within the lever 260 and/or directly between the two sidewalls 270, 280 in the Y-direction, thereby preventing the fastener 230 from interfering with and/or preventing the lever 260 from pivoting. Depending on a position of the seat assemblies 110, 110', the lever 260 may be held and/or maintained in the depressed position by the support member 116' of the second seat assembly 110' (see, e.g., FIGS. 5A and 5B) or the support member 116 of the first seat assembly 110 (see, e.g., FIG. 6). When the lever 260 is held and/or maintained in the depressed position by the first seat assembly 110, the arrangement of the stopper assembly 200 and the portions thereof is substantially similar, if not identical, to when the lever 260 is held in the depressed position by the second seat assembly 110' as shown in FIG. 5B.

Figure 3:
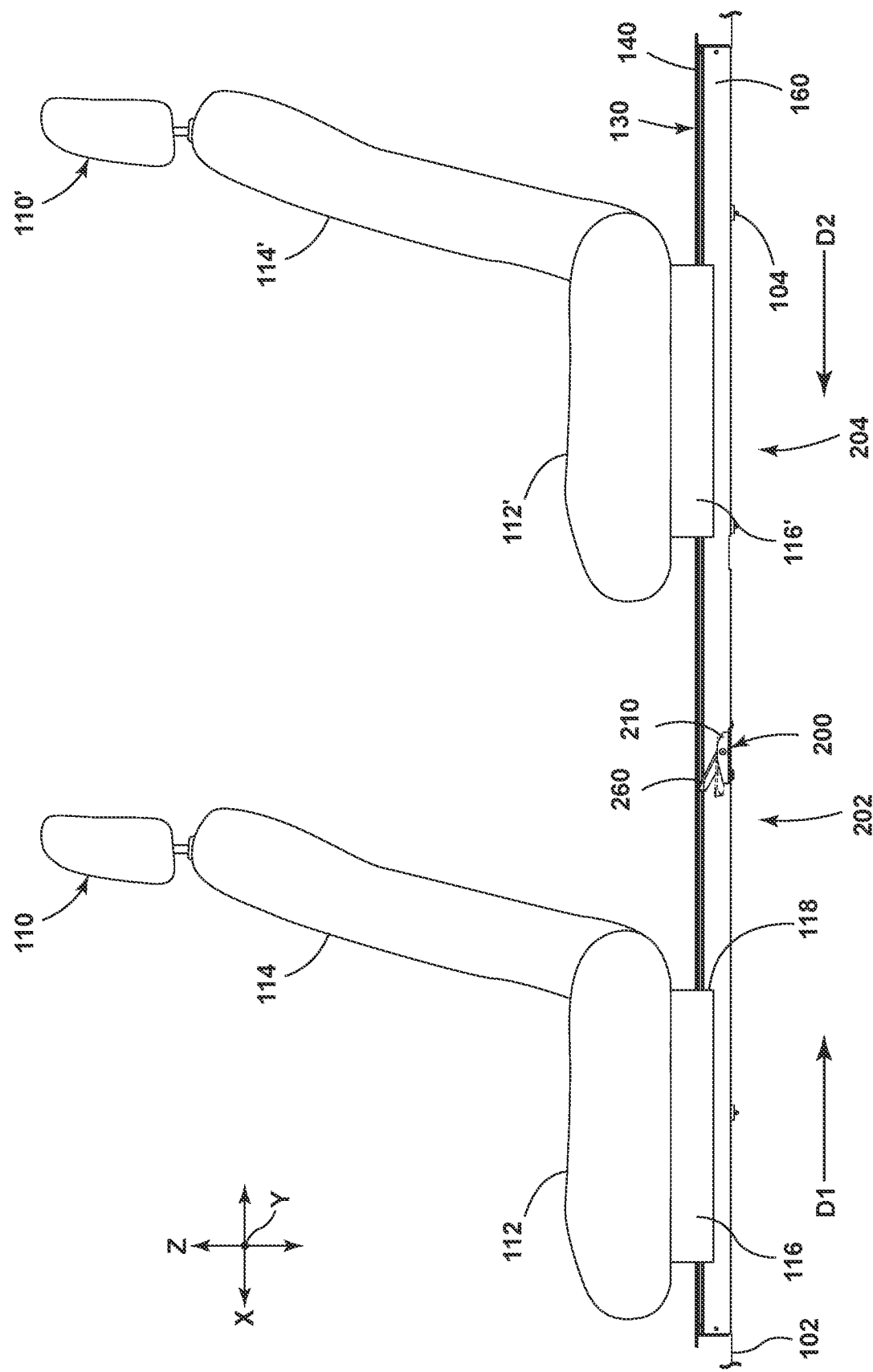
FIG. 3 is a cross-sectional view generally illustrating an embodiment of a seating assembly in which the first seat assembly and the second seat assembly are disposed on opposite sides of the stopper assembly according to teachings of the present disclosure.
Figure 4A:
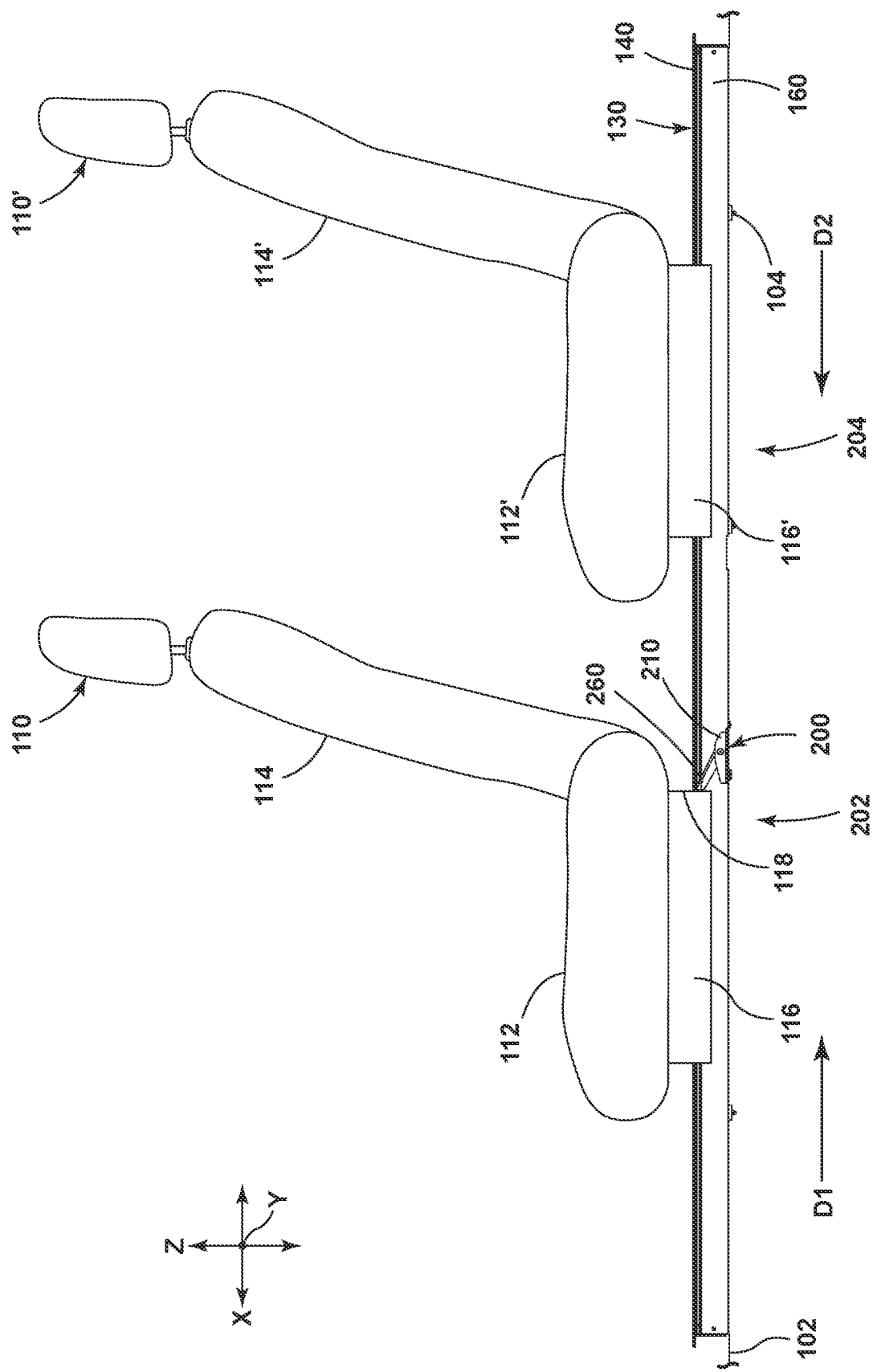
FIG. 4A is a cross-sectional view generally illustrating an embodiment of a seating assembly in which a lever of the stopper assembly is in a stopping position and has contacted the first seat assembly according to teachings of the present disclosure.
Figure 4B:
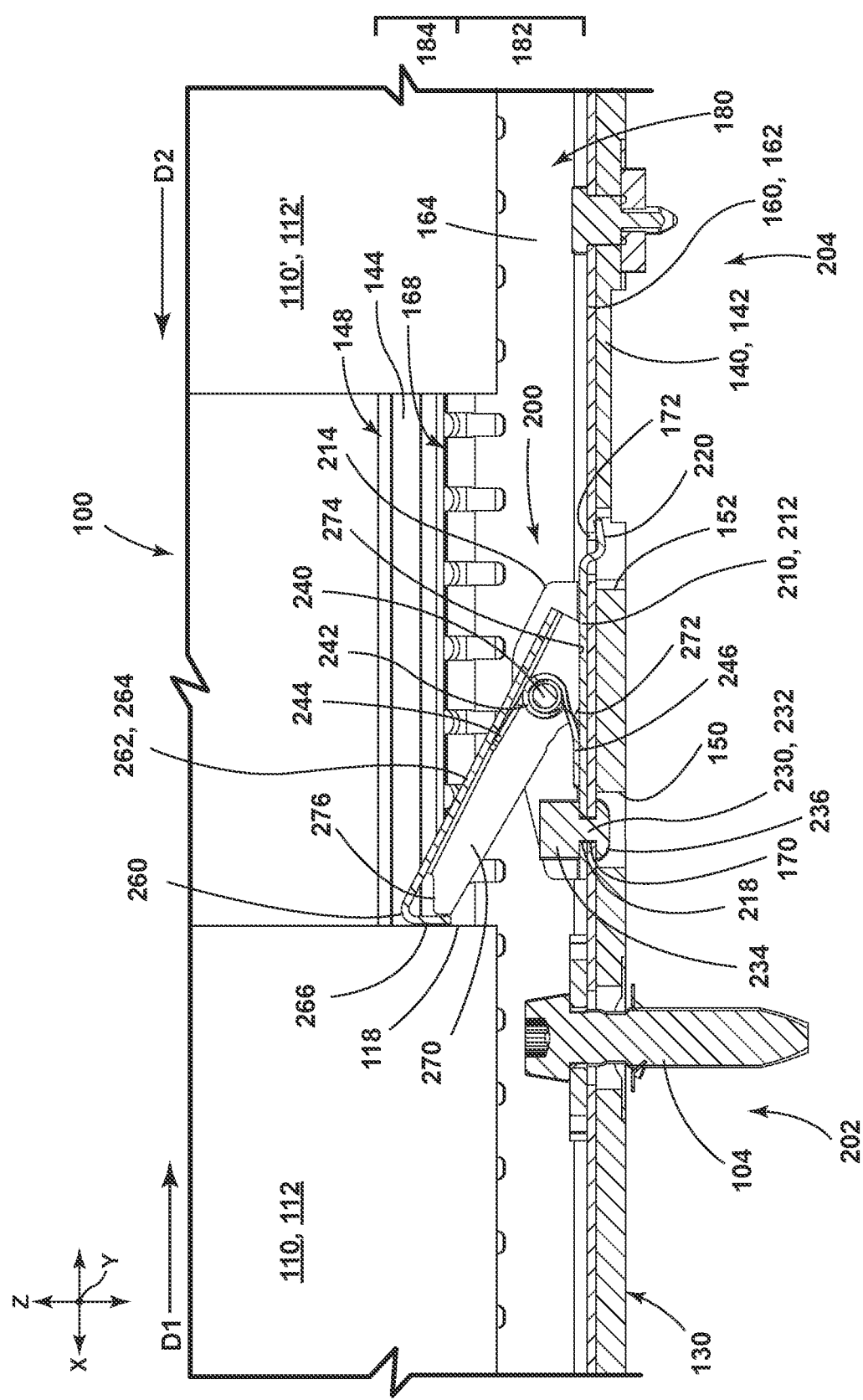
FIG. 4B is a close-up cross-sectional view of a portion of the seating system of FIG. 4A.

As generally illustrated in FIGS. 3-4B, movement of the first seat assembly 110 along the track assembly 130 in the first direction D1 is limited, restricted, and/or blocked by the stopper assembly 200 when the lever 260 is in the stopping position. For example, when the first seat assembly 110 is disposed on the track assembly 130 in a first position in which the first seat assembly 110 is disposed on a first side 202 of the stopper assembly 200 and/or the base 210 thereof (see, e.g., the position shown in FIG. 3) and the first seat assembly 110 is moved along the track assembly 130 in the first direction D1 (e.g., generally toward the second seat assembly 110' in the X-direction), the contact surface 118 of the support member 116 contacts and/or abuts the first longitudinal end of the lever 260 (e.g., the stop flange 266) of the stopper assembly 200 as shown in FIGS. 4A and 4B. This contact limits, restricts, and/or blocks further movement of the first seat assembly 110 in the first direction D1 and effectively prevents the first seat assembly 110 from moving passed the stopper assembly 200 to a position in which the first seat assembly 110 is disposed at least partially above the lever 260 and/or at least partially on a second, opposite side 204 of the stopper assembly 200 and/or the base 210 (e.g., the position shown in FIG. 6).

Figure 5A:
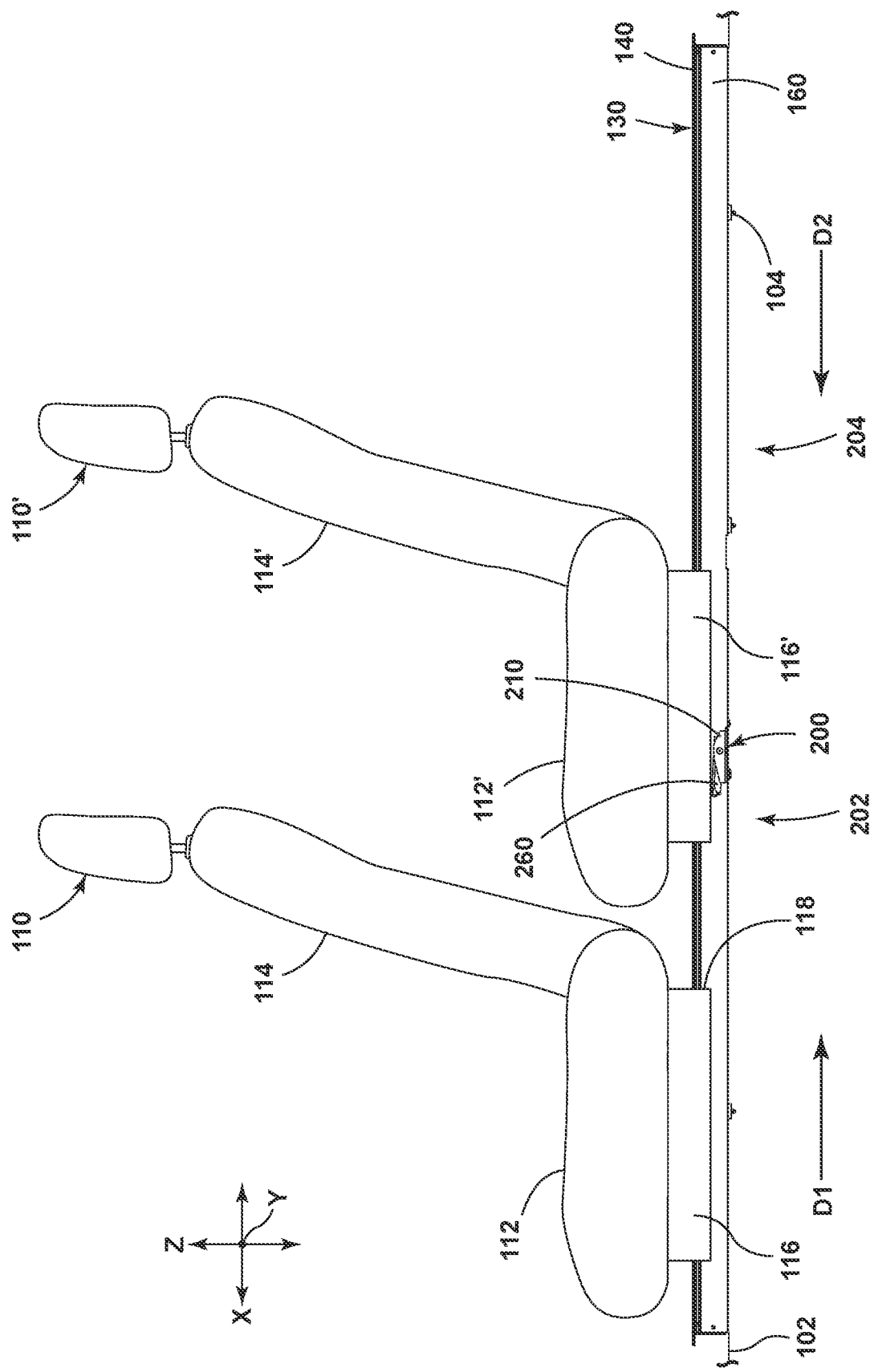
FIG. 5A is a cross-sectional view generally illustrating an embodiment of a seating assembly in which the second seat assembly has pivoted the lever of the stopper assembly to a depressed position according to teachings of the present disclosure.
Figure 5B:
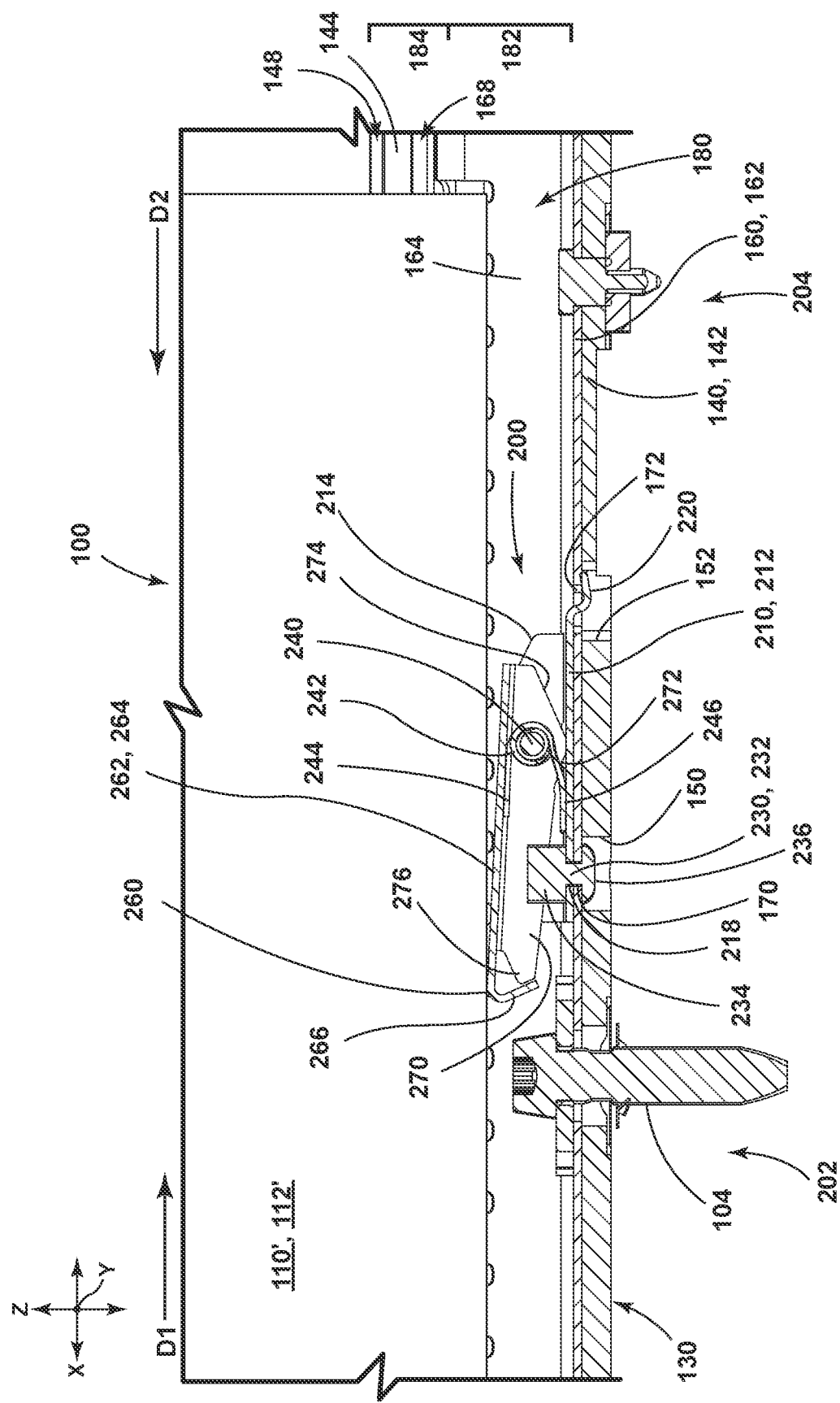
FIG. 5B is a close-up cross-sectional view of a portion of the seating system of FIG. 5A.
Figure 6:
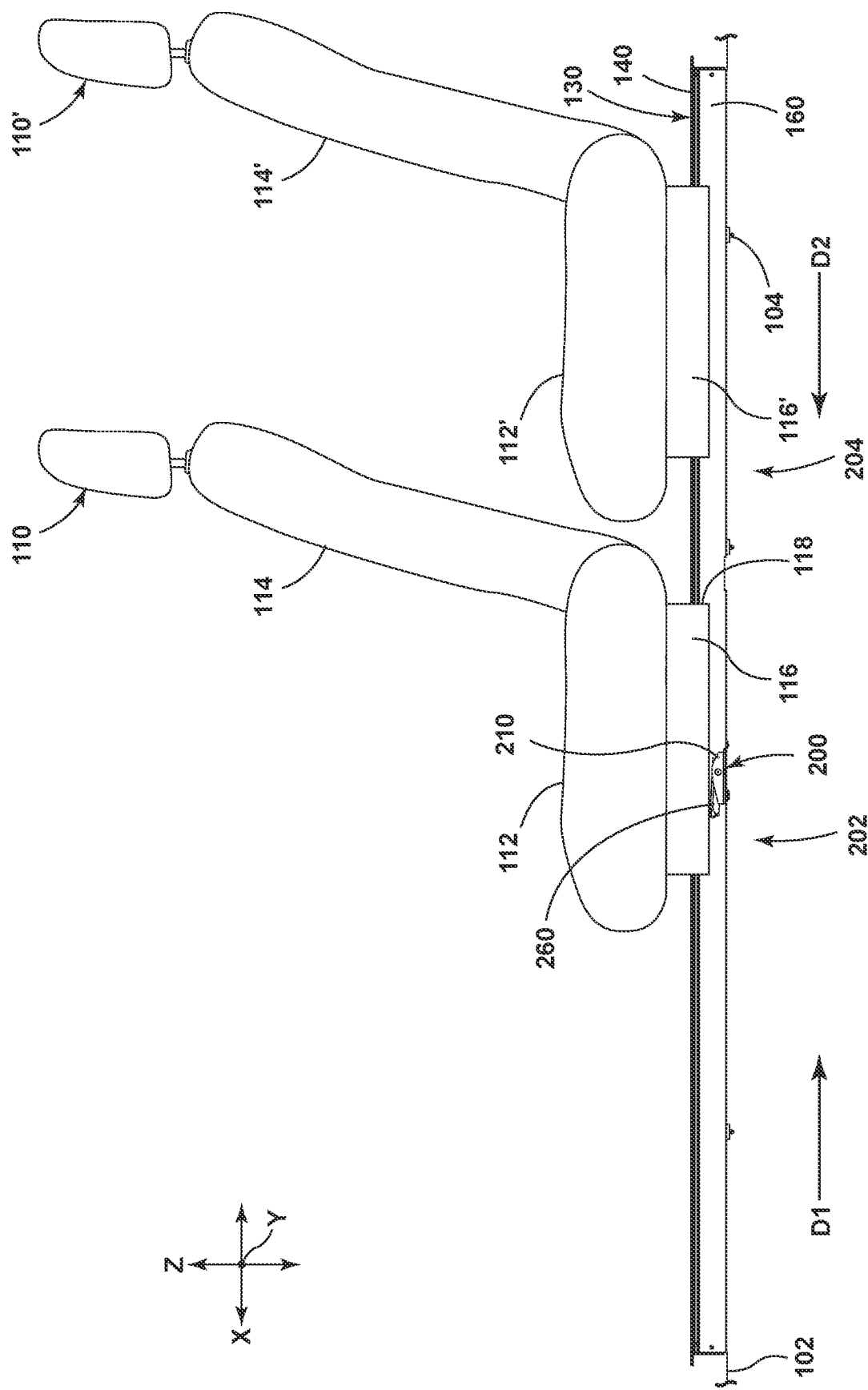
FIG. 6 is a cross-sectional view generally illustrating an embodiment of a seating assembly in which the first seat assembly is holding and/or maintaining the lever of the stopper assembly in the depressed position according to teachings of the present disclosure.

However, movement of the first seat assembly 110 along the track assembly 130 in the first direction D1 is not limited, restricted, and/or blocked by the stopper assembly 200 when the lever 260 is in the depressed position (see, e.g., FIG. 6). In other words, when the lever 260 is in the depressed position, the first seat assembly 110 is adjustable along the track assembly 130 in the first direction D1 from a position on the first side 202 of the stopper assembly 200 and/or the base 210 (e.g., one or more of the positions shown in FIGS. 3-5A) to a position that is at least partially on the second side 204 of the stopper assembly 200 and/or the base 210 (e.g., the position in FIG. 6). The lever 260 can therefore be pivoted and/or rotated from the stopping position to the depressed position (e.g., by a user manually pressing down on the lever 260), to enable the first seat assembly 110 to be moved along the track assembly 130 in the first direction D1 passed the stopper assembly 200.

As generally illustrated in FIGS. 3, 5A, and 5B, movement of the second seat assembly 110' along the track assembly 130 in the second direction D2 is not limited, restricted, and/or blocked by the stopper assembly 200 when the lever 260 is in the stopping position. When the second seat assembly 110' is disposed on the track assembly 130 in a first position in which the second seat assembly 110' is disposed on the second side 204 of the stopper assembly 200 and/or the base 210 thereof (see, e.g., one or more of the positions shown in FIGS. 3, 4A, and 6) and the second seat assembly 110' is moved along the track assembly 130 in the second direction D2 (e.g., generally toward the first seat assembly 110 in the X-direction), the support member 116' contacts and/or abuts the actuation surface 264 of the lever 260. As the second seat assembly 110' continues to move in the second direction D2, the support member 116' slides along the actuation surface 264 of the lever 260 and pushes the lever 260 toward the base 210 (e.g., generally downward in the Z-direction), which pivots and/or rotates the lever 260 about the pin 240 against the biasing force of the biasing member 242 toward, and eventually to, the depressed position (see, e.g., the position shown in FIGS. 5A and 5B). The second seat assembly 110' can thus be adjusted and/or moved as close to the first seat assembly 110 as desired to increase the amount of available space behind the second seat assembly, such as to increase storage area and/or provide additional space to an occupant (e.g., of a third-row seat).

The disclosure includes, without limitation, the following embodiments:

1. A stopper assembly for a seat track assembly, comprising: a base connectable to said seat track assembly; a lever having a first end and a second end, the second end pivotably connected to the base; and a spring applying a biasing force to the lever and biasing the lever into a stopping position in which the first end of the lever limits movement of a first seat assembly mounted on said seat track assembly in a first direction via contacting said first seat assembly; wherein the lever is pivotable to a depressed position in which the first end of the lever does not limit movement of said first seat assembly in the first direction.
2. The stopper assembly of embodiment 1, wherein, when the lever is in the depressed position, said first seat assembly is adjustable along said seat track assembly from a first position on a first side of the base to a second position on a second, opposite side of the base.
3. The stopper assembly according to any of the preceding embodiments, wherein the lever is pivotable to the depressed position via a second seat assembly mounted on said seat track assembly.
4. The stopper assembly according to any of the preceding embodiments, wherein the lever is contacted by said second seat assembly and pivoted to the depressed position when said second seat assembly is moved along said seat track assembly in a second direction, which is opposite the first direction, to a position at which said second seat assembly is disposed at least partially above the lever.
5. The stopper assembly according to any of the preceding embodiments, wherein: said first seat assembly is disposed on a first side of the base; and the lever is contacted by said second seat assembly and pivoted to the depressed position when said second seat assembly is moved along said seat track assembly in a second direction, which is opposite the first direction, from a first position at which said second seat assembly is disposed on a second, opposite side of the base to a second position at which said second seat assembly is disposed at least partially above the lever and/or at least partially on the first side of the base.
6. The stopper assembly according to any of the preceding embodiments, further comprising a pin connecting the second end of the lever to the base.
7. The stopper assembly according to any of the preceding embodiments, wherein: the base includes a bottom and two walls projecting from opposite sides of the bottom; and the pin is connected to and extends between the two walls of the base.
8. The stopper assembly according to any of the preceding embodiments, wherein: the spring is a torsion spring disposed on and wound around the pin; and the torsion spring includes a first spring leg contacting the lever and a second spring leg contacting the base.
9. The stopper assembly according to any of the preceding embodiments, wherein, when the lever is in the stopping position, the lever extends obliquely relative to a bottom of the base with the first end oriented toward said first seat assembly.
10. The stopper assembly according to any of the preceding embodiments, wherein an angle defined between the lever and the bottom of the base is smaller when the lever is in the depressed position than when the lever is in the stopping position.
11. The stopper assembly according to any of the preceding embodiments, wherein the first end of the lever is disposed closer to a bottom of the base when the lever is in the depressed position than when the lever is in the stopping position.
12. The stopper assembly according to any of the preceding embodiments, wherein: the lever has an actuation surface extending obliquely relative to a bottom of the base when the lever is in the stopping position; and the lever pivots to the depressed position when the actuation surface is contacted by a second seat assembly mounted on said seat track assembly moving in a second direction opposite the first direction.
13. The stopper assembly according to any of the preceding embodiments, wherein the lever includes a main body and a stop flange, the stop flange contacting a contact surface of said first seat assembly and limiting movement of said first seat assembly in the first direction.
14. The stopper assembly according to any of the preceding embodiments, wherein the stop flange is disposed at the first end of the lever and projects transversely from the main body.
15. The stopper assembly according to any of the preceding embodiments, wherein, when the lever is in the stopping position, the stop flange is oriented in a complimentary manner to said contact surface of said first seat assembly such that the stop flange contacts said contact surface of said first seat assembly in a substantially flush manner.
16. The stopper assembly according to any of the preceding embodiments, further comprising a fastener engaging a recess of the base and a recess of said seat track assembly, the fastener connecting the base to said seat track assembly.
17. The stopper assembly according to any of the preceding embodiments, wherein the fastener is at least partially received in the lever when the lever is disposed in the depressed position.
18. The stopper assembly according to any of the preceding embodiments, wherein the base includes a mounting tab engaging an opening of said seat track assembly and connecting the base to said seat track assembly.

19. A seat track assembly, according to any of the preceding embodiments, comprising the stopper assembly of embodiment 1 and at least one track pair, wherein: the at least one track pair includes an outer track and an inner track; the inner track is disposed within the outer track; and the stopper assembly is disposed within and connected to the inner track.

20. The seat track assembly according to any of the preceding embodiments, wherein: the base includes: a bottom; two walls projecting from opposite sides of the bottom; a mounting tab projecting from the bottom and engaging an opening of the inner track; and a recess disposed in the bottom; the stopper assembly further includes: a pin connecting the second end of the lever to the base; and a fastener engaging the recess of the base and a recess of the inner track; and the fastener and the mounting tab connect the base to the inner track.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments." "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A stopper assembly for a seat track assembly, comprising:
   a base connectable to said seat track assembly;
   a lever having a first end and a second end, the second end pivotably connected to the base; and
   a spring applying a biasing force to the lever and biasing the lever into a stopping position in which the first end of the lever limits movement of a first seat assembly mounted on said seat track assembly in a first direction via contacting said first seat assembly;
   wherein the lever is pivotable to a depressed position in which the first end of the lever does not limit movement of said first seat assembly in the first direction.

2. The stopper assembly of claim 1, wherein, when the lever is in the depressed position, said first seat assembly is adjustable along said seat track assembly from a first position on a first side of the base to a second position on a second, opposite side of the base.

3. The stopper assembly of claim 1, wherein the lever is pivotable to the depressed position via a second seat assembly mounted on said seat track assembly.

4. The stopper assembly of claim 3, wherein the lever is contacted by said second seat assembly and pivoted to the depressed position when said second seat assembly is moved along said seat track assembly in a second direction, which is opposite the first direction, to a position at which said second seat assembly is disposed at least partially above the lever.

5. The stopper assembly of claim 3, wherein:
   said first seat assembly is disposed on a first side of the base; and
   the lever is contacted by said second seat assembly and pivoted to the depressed position when said second seat assembly is moved along said seat track assembly in a second direction, which is opposite the first direction, from a first position at which said second seat assembly is disposed on a second, opposite side of the base to a second position at which said second seat assembly is disposed at least partially above the lever or at least partially on the first side of the base.

6. The stopper assembly of claim 1, further comprising a pin connecting the second end of the lever to the base.

7. The stopper assembly of claim 6, wherein:
   the base includes a bottom and two walls projecting from opposite sides of the bottom; and
   the pin is connected to and extends between the two walls of the base.

8. The stopper assembly of claim 7, wherein:
   the spring is a torsion spring disposed on and wound around the pin; and
   the torsion spring includes a first spring leg contacting the lever and a second spring leg contacting the base.

9. The stopper assembly of claim 1, wherein, when the lever is in the stopping position, the lever extends obliquely relative to a bottom of the base with the first end oriented toward said first seat assembly.

10. The stopper assembly of claim 9, wherein an angle defined between the lever and the bottom of the base is smaller when the lever is in the depressed position than when the lever is in the stopping position.

11. The stopper assembly of claim 1, wherein the first end of the lever is disposed closer to a bottom of the base when the lever is in the depressed position than when the lever is in the stopping position.

12. The stopper assembly of claim 1, wherein:
   the lever has an actuation surface extending obliquely relative to a bottom of the base when the lever is in the stopping position; and
   the lever pivots to the depressed position when the actuation surface is contacted by a second seat assembly mounted on said seat track assembly moving in a second direction opposite the first direction.

13. The stopper assembly of claim 1, wherein the lever includes a main body and a stop flange, the stop flange contacting a contact surface of said first seat assembly and limiting movement of said first seat assembly in the first direction.

14. The stopper assembly of claim 13, wherein the stop flange is disposed at the first end of the lever and projects transversely from the main body.

15. The stopper assembly of claim 13, wherein, when the lever is in the stopping position, the stop flange is oriented in a complimentary manner to said contact surface of said first seat assembly such that the stop flange contacts said contact surface of said first seat assembly in a substantially flush manner.

16. The stopper assembly of claim 1, further comprising a fastener engaging a recess of the base and a recess of said seat track assembly, the fastener connecting the base to said seat track assembly.

17. The stopper assembly of claim 16, wherein the fastener is at least partially received in the lever when the lever is disposed in the depressed position.

18. The stopper assembly of claim 1, wherein the base includes a mounting tab engaging an opening of said seat track assembly and connecting the base to said seat track assembly.

19. A seat track assembly, comprising the stopper assembly of claim 1 and at least one track pair, wherein:
   the at least one track pair includes an outer track and an inner track;
   the inner track is disposed within the outer track; and
   the stopper assembly is disposed within and connected to the inner track.

20. The seat track assembly of claim 19, wherein:
   the base includes:
      a bottom;
      two walls projecting from opposite sides of the bottom;
      a mounting tab projecting from the bottom and engaging an opening of the inner track; and
      a recess disposed in the bottom;
   the stopper assembly further includes:
      a pin connecting the second end of the lever to the base; and
      a fastener engaging the recess of the base and a recess of the inner track; and
   the fastener and the mounting tab connect the base to the inner track.

* * * * *